(12) United States Patent
Salman (10) Patent No.: US 10,678,511 B1
(45) Date of Patent: Jun. 9, 2020

(54) GENERATING PSEUDO-RANDOM NUMBERS USING CELLULAR AUTOMATA

(71) Applicant: Karim Salman, Murfreesboro, TN (US)

(72) Inventor: Karim Salman, Murfreesboro, TN (US)

( * ) Notice: Subject to any disclaimer, the term of this patent is extended or adjusted under 35 U.S.C. 154(b) by 0 days.

(21) Appl. No.: 16/133,845

(22) Filed: Sep. 18, 2018

Related U.S. Application Data (63) Continuation-in-part of application No. 14/711,350, filed on May 13, 2015, now Pat. No. 10,078,492.

(60) Provisional application No. 61/992,390, filed on May 13, 2014.

(51) Int. Cl.
*G06F 7/58* (2006.01)
*H04W 12/04* (2009.01)

(52) U.S. Cl.
CPC ............ *G06F 7/584* (2013.01); *H04W 12/04* (2013.01)

(58) Field of Classification Search
None
See application file for complete search history.

(56) References Cited

U.S. PATENT DOCUMENTS

| | | | | | |
|---|---|---|---|---|---|
| 4,961,159 | A | * | 10/1990 | McLeod | G01R 31/31813 708/250 |
| 5,369,648 | A | * | 11/1994 | Nelson | G01R 31/31838 708/252 |
| 7,389,316 | B1 | * | 6/2008 | Baetoniu | G06F 1/02 708/250 |
| 8,023,649 | B2 | * | 9/2011 | Mihaljevic | G06F 7/582 380/268 |
| 2003/0078951 | A1 | * | 4/2003 | Shackleford | G06F 7/582 708/250 |

* cited by examiner

*Primary Examiner* — Michael D. Yaary
(74) *Attorney, Agent, or Firm* — Wayne Edward Ramage; Baker Donelson (57) ABSTRACT

A method for using cellular automata to generate quality pseudo-random numbers, which may be used in cryptographic and other applications. A cellular automaton is a decentralized computing model that enables the performance of complex computations with the help of only local information. In general, cellular automata comprise a plurality of identical basic memory building blocks that are discrete in time and space, where the structure evolves over time according to a local transition rule. Cellular automata can be used in information security as an alternative for classic Feedback Shift Registers (FSRs) for pseudo-random sequence generation. The outputs of a pair of linear FSRs (LFSRs) act as continuous inputs to the two boundaries of a one-dimensional or two-dimensional elementary cellular automata.

9 Claims, 9 Drawing Sheets

Illustration of Rule 30 operating on the present state of neighborhood of time step $t$ to produce the next state cell of time step $t+1$.

| Present State $c_k^t$ | Neighborhood $c_{k+1}^t - c_{k-1}^t$ | | | |
|---|---|---|---|---|
| | 0-0 | 0-1 | 1-1 | 1-0 |
| 0 | 0 | 1 | 0 | 1 |
| 1 | 1 | 1 | 0 | 0 |

Next State

GENERATING PSEUDO-RANDOM NUMBERS USING CELLULAR AUTOMATA

This application is a continuation-in-part application of U.S. patent application Ser. No. 14/711,350, filed May 13, 2015, which claims benefit of and priority to U.S. Provisional Application No. 61/992,390, filed May 13, 2014, and is entitled to those filing dates for priority in whole or in part. The specifications, figures, appendices, and complete disclosures of U.S. Provisional Application No. 61/992,390 and U.S. patent application Ser. No. 14/711,350 are incorporated herein by specific reference for all purposes.

FIELD OF INVENTION

This invention relates to a system and related methods for using cellular automata to generate quality pseudo-random numbers, particularly for use in cryptography.

SUMMARY OF INVENTION

In various exemplary embodiments, the present invention comprises a method for using cellular automata to generate quality pseudo-random numbers, which may be used in cryptographic and other applications. A cellular automaton is a decentralized computing model that enables the performance of complex computations with the help of only local information. In general, cellular automata comprise a plurality of identical basic memory building blocks that are discrete in time and space, where the structure evolves over time according to a local transition rule. A simple structure can then evolve into an extremely complex digital structures.

Cellular automata can be used in information security as an alternative for classic Feedback Shift Registers (FSRs) for pseudo-random sequence generation. In particular, one-dimensional and two-dimensional cellular automata are used to general pseudo-random sequences with good statistical features for use in Monte Carlo simulations, communications, cryptography, and network security. In one embodiment, the outputs of a pair of linear FSRs (LFSRs) act as continuous inputs to the two boundaries of a one-dimensional elementary cellular automata.

DETAILED DESCRIPTION OF EXEMPLARY EMBODIMENTS

In various exemplary embodiments, the present invention comprises a method for using elementary cellular automata (ECA) to generate quality pseudo-random numbers, which may be used in cryptographic and other applications. A cellular automaton is a decentralized computing model that enables the performance of complex computations with the help of only local information. In general, cellular automata comprise a plurality of identical basic memory building blocks that are discrete in time and space, where the structure evolves over time according to a local transition rule. A simple structure can then evolve into an extremely complex digital structures.

Figure 1:
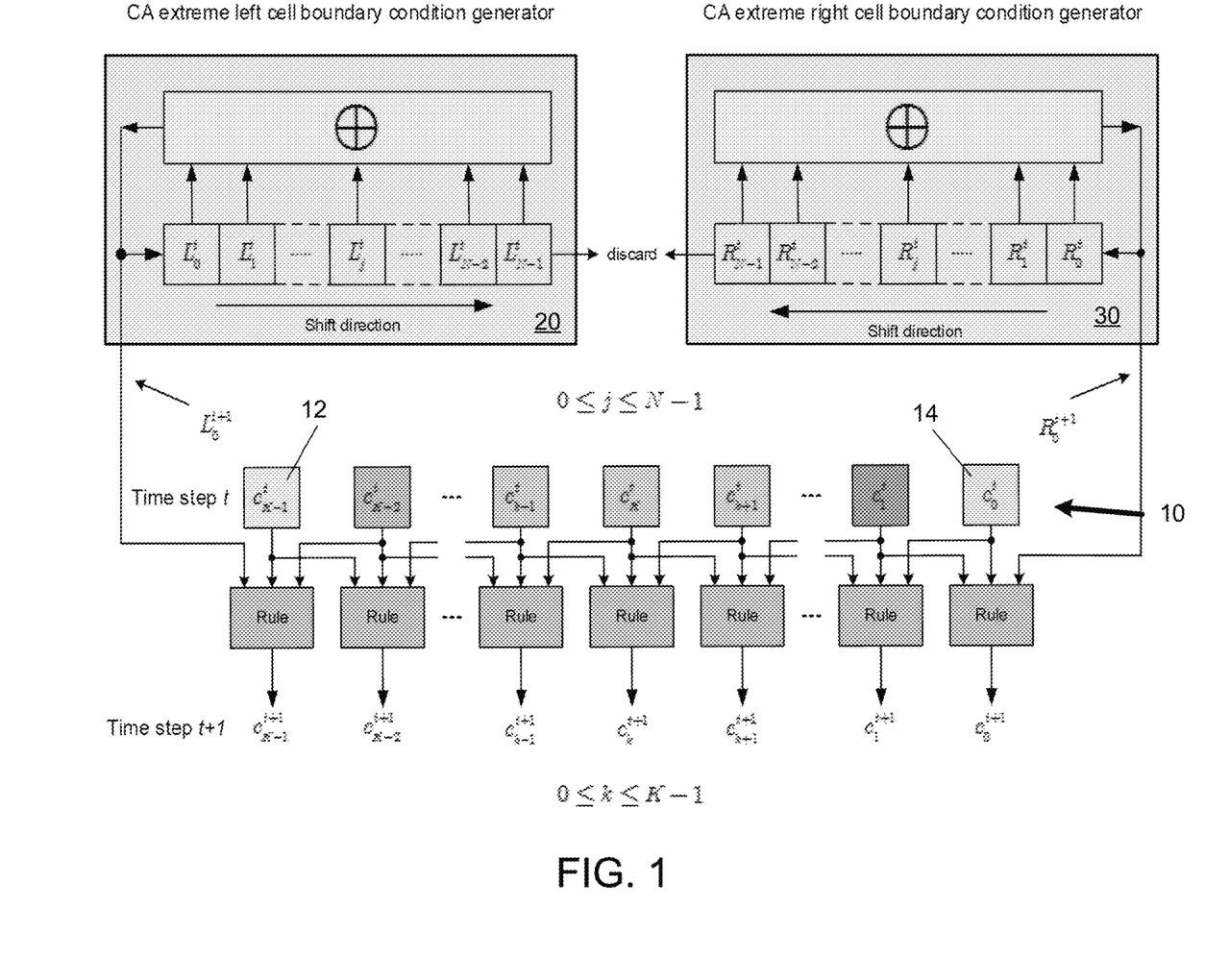
FIG. 1 shows a diagram of an elementary cellular automata system in accordance with an embodiment of the present invention.

As described herein, and in the attached appendices, cellular automata can be used in information security as an alternative for classic Feedback Shift Registers (FSRs) for pseudo-random sequence generation. In particular, one-dimensional and two-dimensional cellular automata are used to general pseudo-random sequences with good statistical features for use in Monte Carlo simulations, communications, cryptography, and network security. In one embodiment, the outputs of a pair of linear FSRs (LFSRs) 20, 30 act as continuous inputs to the two boundaries of a one-dimensional elementary cellular automata 10, as seen in FIG. 1.

Figure 2:
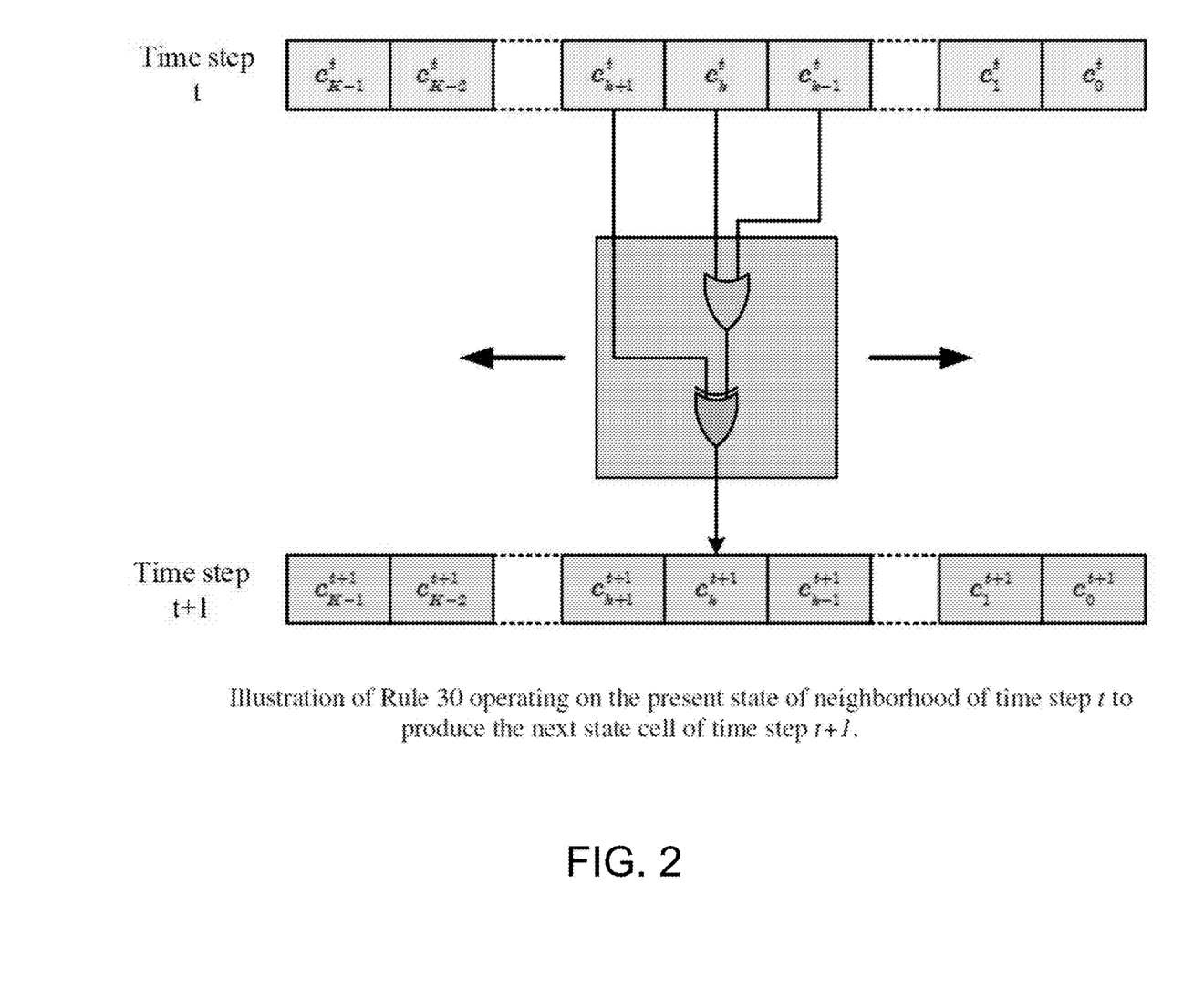
FIG. 2 shows a diagram of chaotic rule 30 operating on a one-dimensional cellular automaton.

FIG. 2 shows an illustration of a one dimensional cellular automaton operated on by chaotic rule 30 at the present state of neighborhood of time step t to produce the next state cell of time step t+1. The cells are arranged on a linear finite lattice, with a symmetrical neighborhood of three cells and radius r=1. Each cell takes its value from the set $G=\{0, 1, \ldots, p\}$ and let p=2. All cells are updated synchronously and the cells are restricted to local neighborhood interaction with no global communication. The ECA will evolve according to one uniform neighborhood transition function, which is a local function (rule) $f: G^{2r+1} \rightarrow G$ where the ECA evolves after a certain number of time steps T Using rule 30 as suggested by Wolfram, it follows that a one-dimensional (1-D) ECA is a linear register of K, K ∈ ¥, memory cells. Each cell is represented by $c^t_k$, where k=[1:K] and t=[1, ¥), that describes the content of memory location k at time evolution step t. Since p=2 the cell takes one of two states from GF(2). This implies the applicability of Boolean algebra to the design over GF(2). A minimum Boolean representation of chaotic Rule 30 in terms of the relative neighborhood cells is:

$$c_k^{t+1} = c_{k+1}^t \oplus (c_k^t + c_{k-1}^t) \text{ or } c_i^{t+1} = c_{k+1}^t + c_k^t + c_{k-1}^t + (c_k^t \times c_{k-1}^t) \bmod 2$$

where 2≤k≤K−2, as depicted in FIG. 2.

Figure 3:
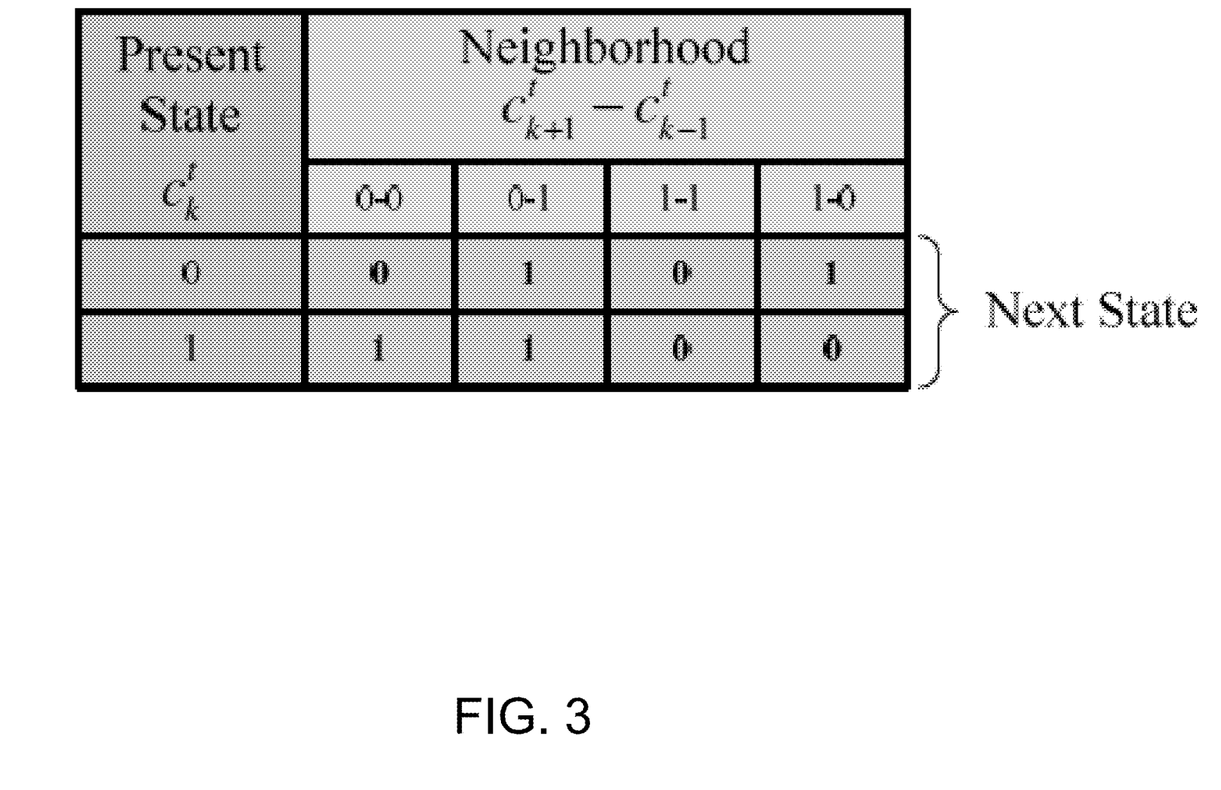
FIG. 3 shows an example of a state machine analysis table.
Figure 4:
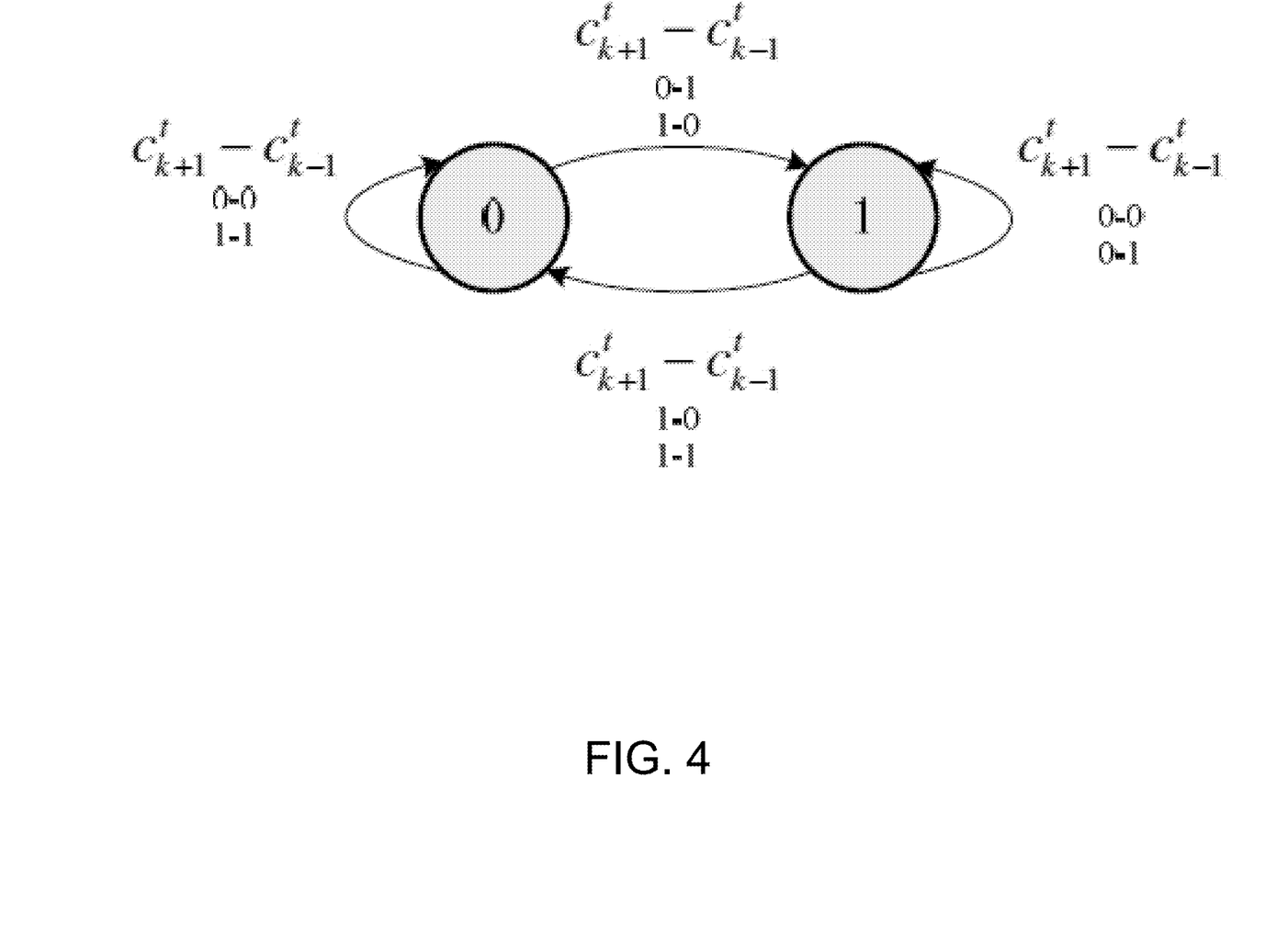
FIG. 4 shows an example of a state machine analysis diagram.

Since the ECA is actually a finite state machine, then the present state of the neighborhood of cell $c^t_k$, ($c^t_{k+1}$, $c^t_k$, $c^t_{k-1}$) at time step t and the next state $c_{k+1}^{t+1}$, at time step t+1, can be analyzed by the state transition table (shown in FIG. 3) and the state diagram (shown in FIG. 4).

It can be seen from above that in order to evolve from the present time step t to the next time step t+1, each cell at lattice location k would require the present state of itself, $c^t_k$, as well as the present state of the other two cells in its neighborhood, $c^t_{k+1}$ and $c^t_{k-1}$. Therefore, if the ECA is allowed to expand freely, leftwise and rightwise, the total number of cells at each time step t+1, say K N would need K+2 cells at time step t. The eventually leads to an impractical span of the ECA, hence the ECA should be bounded. However, fixed boundary conditions lead to poor randomization, and thus prevent the bounded ECA from being used as a source of generating random numbers.

Figure 5:
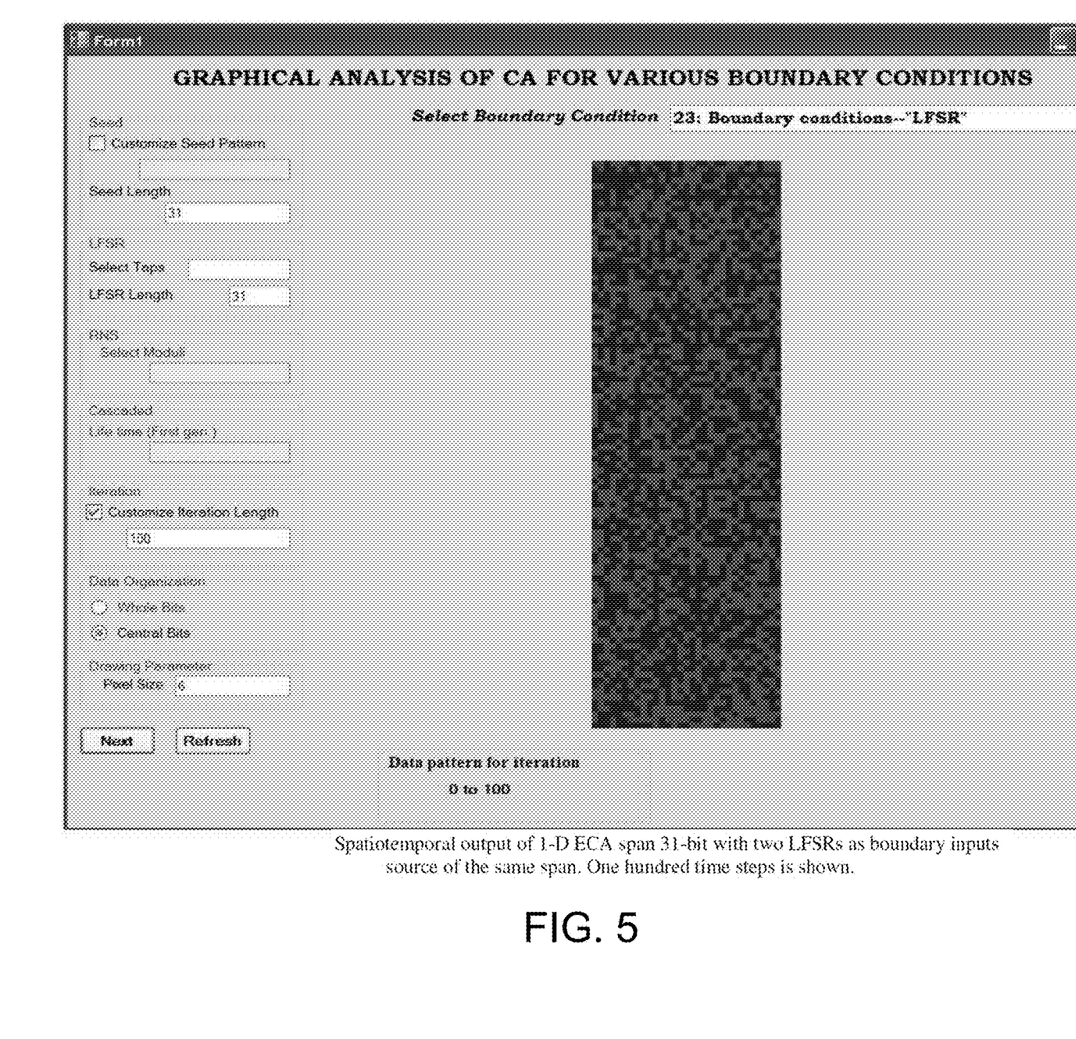
FIG. 5 shows an example of the spatiotemporal output of a one-dimensional cellular automaton operating with two LFSRs as boundary inputs for 100 time steps.

In one embodiment, as seen in FIG. 1, the present invention comprises a bounded one-dimensional ECA 10, with a pair of LFSRs 20, 30 acting as continuous inputs to the extreme boundary cells of the ECA (i.e, each LFSR acts as input to a corresponding boundary cell). The LFSRs may be uncorrelated, run independently and synchronously, and are used to generate the two boundary conditions. In the diagram shown, the most significant cell is the extreme left hand cell 12, and the least significant cell is the extreme right hand cell 14, although in other configurations the opposite may be true. The output string of the center bit of the ECA evolving for time steps $T=2^K$, where K is the span length of the ECA, passes the Diehard statistical battery of tests, and can be used for parallel random number generation in computer systems and applications. Good results have been achieved with spans as low as 27 bits. An example of a spatiotemporal output of a one-dimensional ECA span 31-bit with two LFSRs as boundary inputs is seen in FIG. 5.

The technique described herein works with multiple-dimensioned cellular automata, and with other chaotic rules as well.

In several embodiments, the present invention considers the whole data of the cellular automata, as compared to prior art approaches where only the data due to the center cell is considered and the rest of the data is discarded. The present invention modifies the periodic configuration such that external and independent sources of signals are used to act as the boundary cells and placed adjacent to the two extreme end cells.

Figure 6:
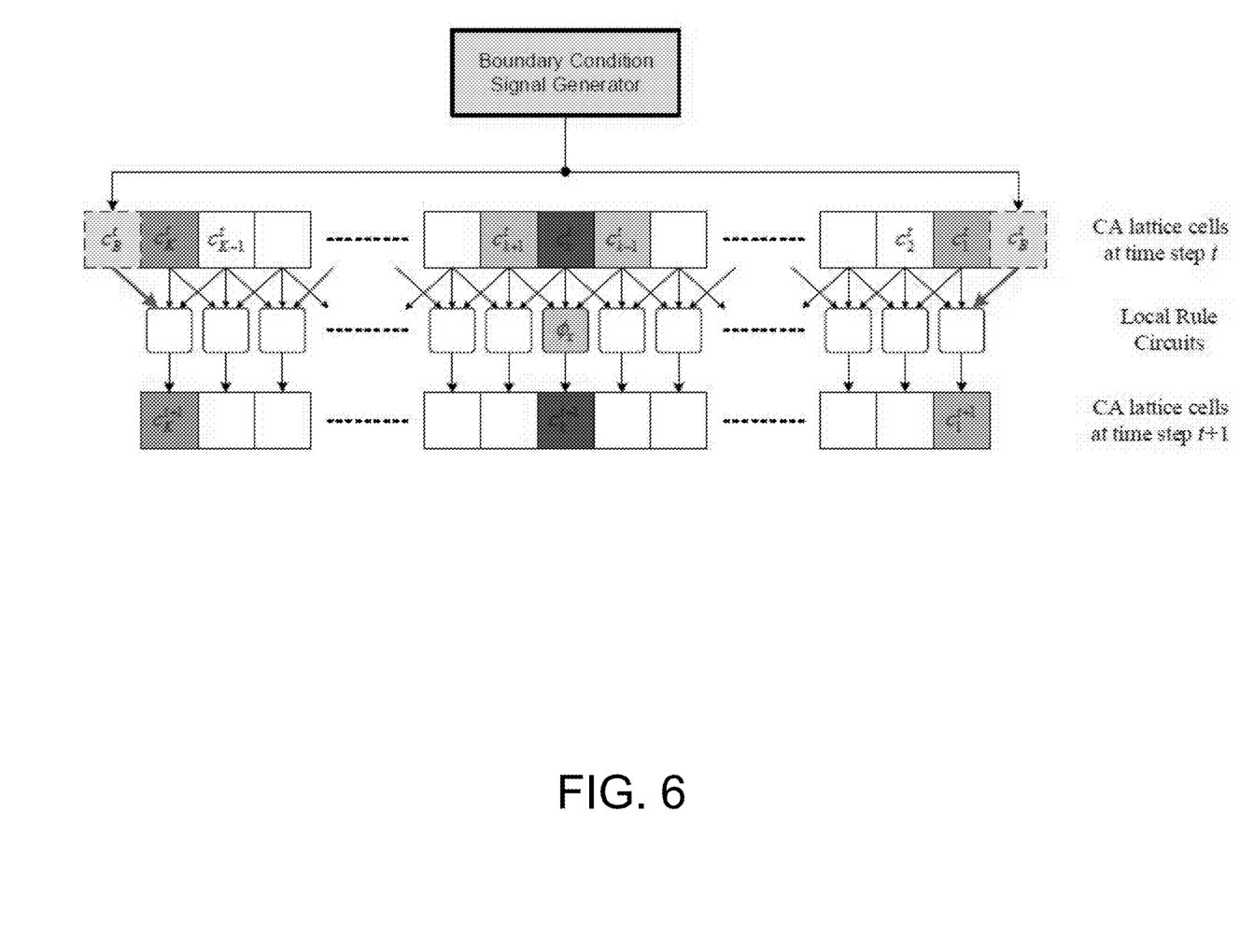
FIG. 6 shows an example of an elementary cellular automaton with 1-bit external and independent boundary condition.

FIG. 6 shows an example of a cellular automaton with a source generating one cell at each iteration. For a cellular automaton with a finite lattice span K, the next state of the extreme end cells can be computed as follows: $c_1^{t+1}=\phi_x(c_2^t, c_1^t, c_B^t)$ and $c_K^{t+1}=\phi_x(c_B^t, c_K^t, c_{K-1}^t)$.

Figure 7:
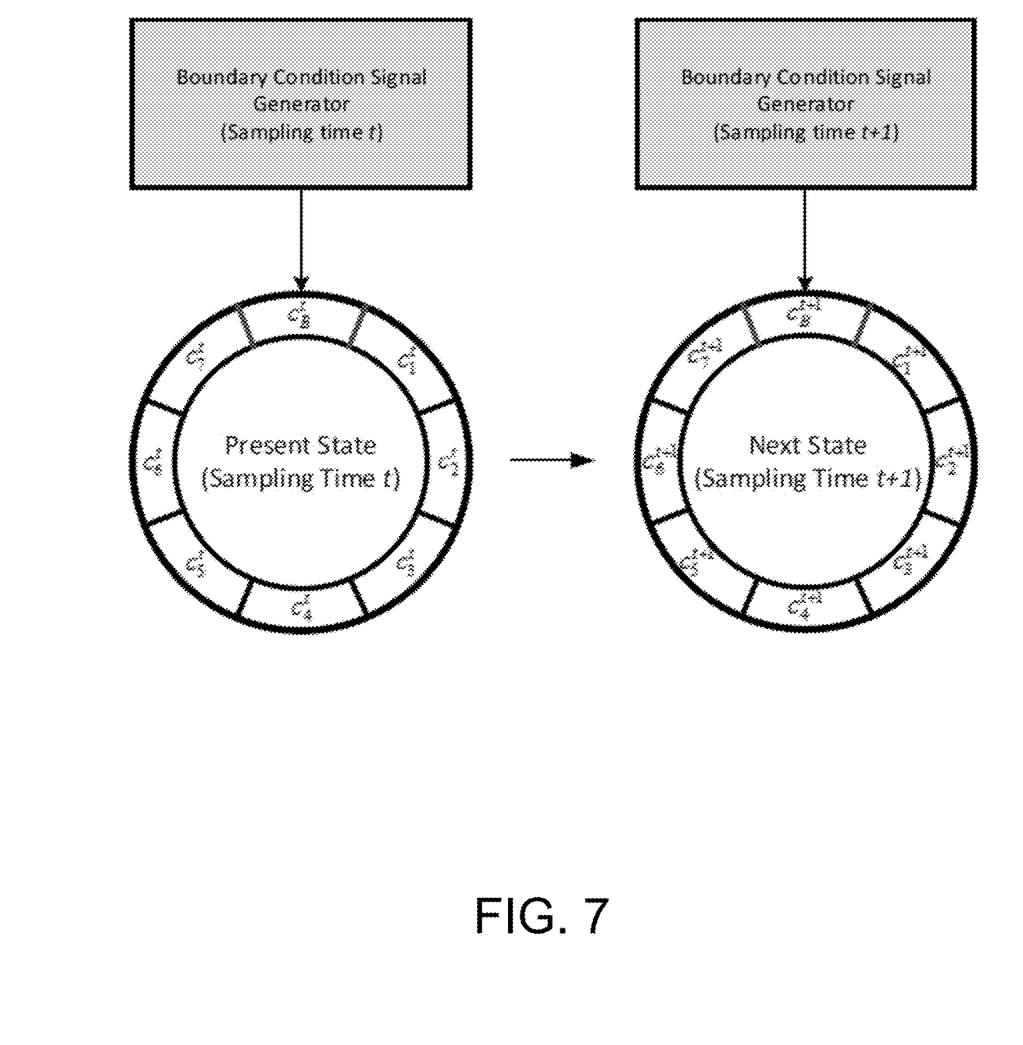
FIG. 7 shows the cellular automaton configuration of FIG. 6 in circular arrangement.

The boundary cell generated by the boundary condition signal generator is represented by $c_B^t$ and the cellular automaton is assumed to be uniform, i.e. the same local rule $\phi_x$ is used throughout the entire lattice span. It can be seen that the boundary condition signal generator generate new value for $c_B^t$ for each new iteration sample t. The new cellular automaton configuration can also be considered as circular when the externally generated boundary cell $c_B^t$ is inserted as illustrated in FIG. 7 for a finite lattice span K=7.

Figure 8:
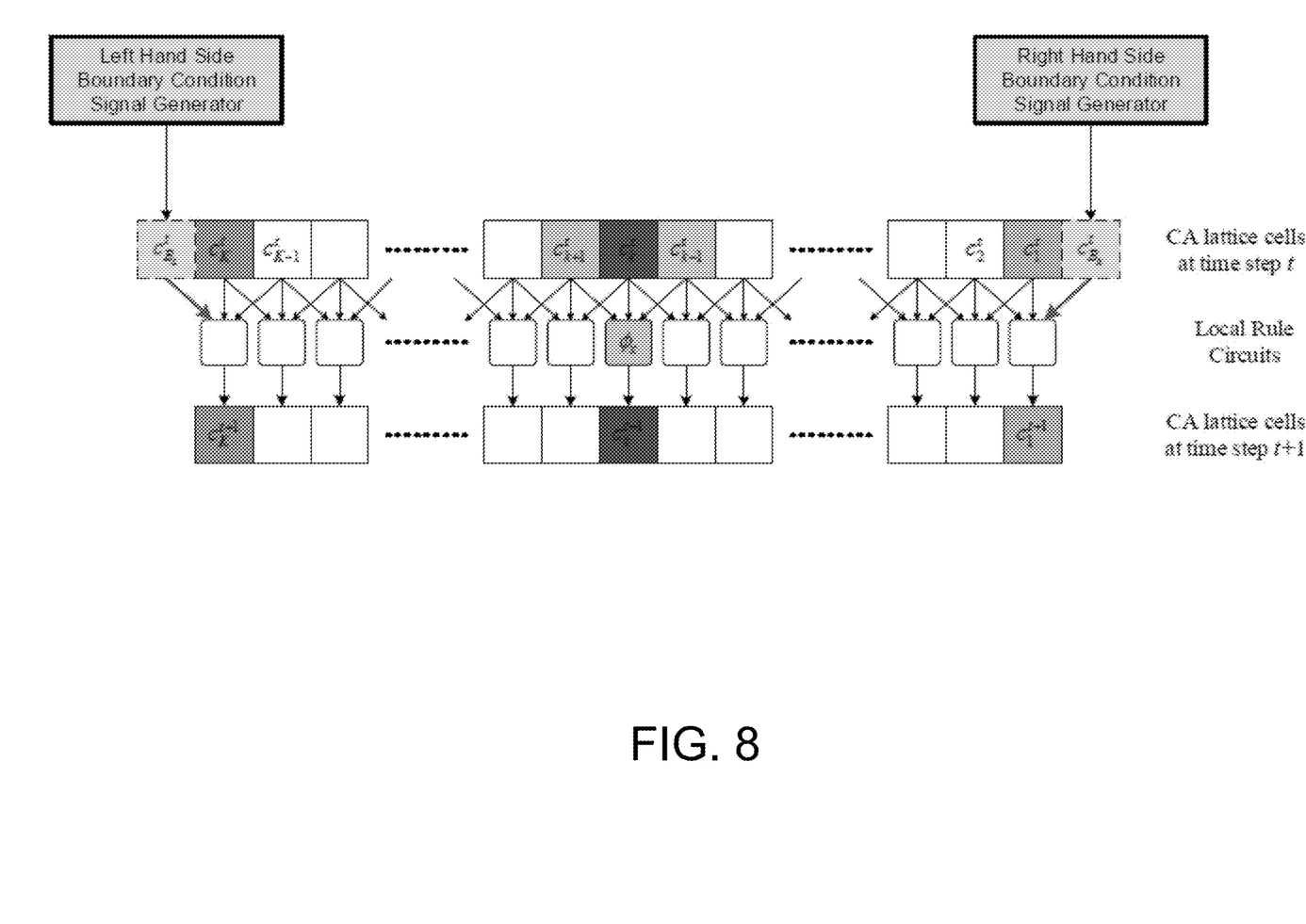
FIG. 8 shows an example of an elementary cellular automaton with 2-bit external and independent boundary conditions.
Figure 9:
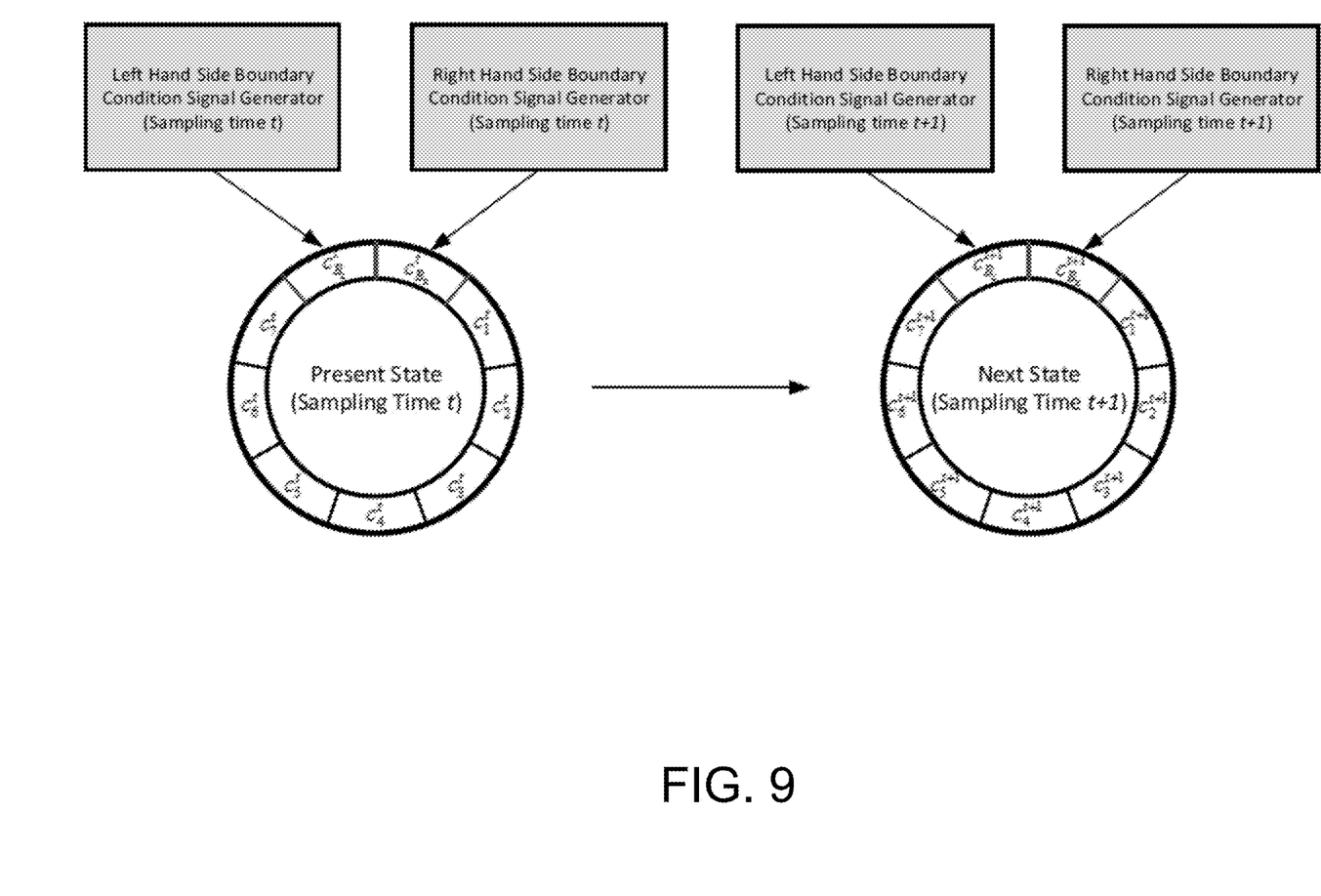
FIG. 9 shows the cellular automaton configuration of FIG. 8 in circular arrangement.

Since the boundary cell is generated independently the computational complexity of the new bounded cellular automata increases by a factor B, which is the computational complexity of the source generating the boundary condition. Therefore the computational complexity increases from $T*2^K$ to $T*2^{K+B}$. Since the total iteration period T remains to be constant the asymptotic complexity becomes $O(2^{K+B})$. The factor B depends completely on the choice of the source generating the boundary condition. It can be generated by a proper size of a LFSR, another cellular automata, or any other source. The boundary condition signals may be synchronized in time with the clock generator controlling the bounded cellular automata. If the source for the boundary conditions is another ECA then the asymptotic complexity of the ECA with one external boundary input becomes $O(2^{K+O(2^{K_B})})$, where the boundary ECA lattice span length is $K_B \in \infty$. The addition of the boundary condition makes the task of the cryptanalyst harder and becomes no less than guessing the [0, 1] probability. If the source of the boundary condition is well balanced then the guessing probability cannot be better than 50%. The complexity can be further increased by injecting the cellular automaton by two independent boundary condition sources, one to be adjacent to the extreme left hand side end cell while the second becomes adjacent to the extreme right hand side cell as depicted in FIGS. 8 and 9. FIG. 9 shows the circular arrangement for K=7.

The expressions for the next state for the two extreme end cells, the right hand side as well as the left hand side for K=7 are computed thus: $c_1^{t+1}=\phi_x(c_2^t, c_1^t, c_{B_8}^t)$ and $c_7^{t+1}=\phi_x(c_2^t, c_1^t, c_{B_t}^t)$. The asymptotic complexity of the new configuration can be deduced in the same manner as before. It becomes $$O\left(2^{K+O\left(2^{K_{B_L}}\right)+O\left(2^{K_{B_R}}\right)}\right).$$

Therefore the task of the cryptanalyst becomes even much harder.

These embodiments, as well as other exemplary embodiments, as well as the tools and programs referenced above, are described in detail in the attached materials which are attached hereto as an appendix, and incorporated herein in their entirety (including all text and figures therein) by reference:

"Bounded 1-D ECA" (5 pages)

In order to provide a context for the various computer-related aspects of the invention, the following discussion provides a brief, general description of a suitable computing environment in which several aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A machine for improved generation of pseudo-random numbers in a computer system, comprising:
a processor or microprocessor coupled to a memory, wherein the microprocessor is programmed to generate a pseudo-random number using the output from the center bit of a bounded one-dimensional cellular automaton with a fixed span and an extreme left boundary cell and an extreme right boundary cell, wherein a left side boundary condition signal generator provides input to the extreme left boundary cell, and a right side boundary condition signal generator provides input to the extreme right boundary cell.

2. The machine of claim 1, wherein the left side boundary condition signal generator and the right side boundary condition signal generator are independent, and external to the cellular automaton.

3. The machine of claim 1, wherein the left side boundary condition signal generator is an elementary cellular automaton.

4. The machine of claim 1, wherein the right side boundary condition signal generator is an elementary cellular automaton.

5. The machine of claim 1, wherein the extreme left boundary cell is the most significant cell in the cellular automaton.

6. The machine of claim 1, wherein the extreme right boundary cell is the least significant cell in the cellular automaton.

7. The machine of claim 1, wherein the extreme left boundary cell is the least significant cell in the cellular automaton.

8. The machine of claim 1, wherein the extreme right boundary cell is the most significant cell in the cellular automaton.

9. The machine of claim 1, where the output from the center bit is used after the cellular automaton has evolved for steps $T=2^K$, where K is the span length of the cellular automaton.

\* \* \* \* \*